US012688958B2

(12) United States Patent
Machida et al.

(10) Patent No.: US 12,688,958 B2
(45) Date of Patent: Jul. 21, 2026

(54) RARE-EARTH COBALT PERMANENT MAGNET, MANUFACTURING METHOD THEREFOR, AND DEVICE

(71) Applicant: TOKIN Corporation, Shiroishi (JP)

(72) Inventors: Hiroaki Machida, Shiroishi (JP); Teruhiko Fujiwara, Shiroishi (JP); Hirokazu Makuta, Shiroishi (JP); Chieko Fujimoto, Shiroishi (JP); Yu Kanamori, Shiroishi (JP)

(73) Assignee: TOKIN CORPORATION, Shiroishi (JP)

( * ) Notice: Subject to any disclaimer, the term of this patent is extended or adjusted under 35 U.S.C. 154(b) by 0 days.

(21) Appl. No.: 17/160,025

(22) Filed: Jan. 27, 2021

(65) Prior Publication Data

US 2021/0249165 A1 Aug. 12, 2021

(30) Foreign Application Priority Data

Feb. 6, 2020 (JP) ................................ 2020-018900

(51) Int. Cl.
*H01F 1/057* (2006.01)
*B22F 3/10* (2006.01)
(Continued)

(52) U.S. Cl.
CPC .............. *H01F 1/0577* (2013.01); *B22F 3/10* (2013.01); *B22F 3/24* (2013.01); *C22C 19/07* (2013.01); *C22C 30/02* (2013.01); *H01F 1/0576* (2013.01); *B22F 2003/248* (2013.01); *B22F 2301/155* (2013.01); *C22C 2202/02* (2013.01)

(58) Field of Classification Search
None
See application file for complete search history.

(56) References Cited

U.S. PATENT DOCUMENTS

| | | | |
|---|---|---|---|
| 3,982,971 | A | 9/1976 | Yamanaka et al. |
| 4,322,257 | A | 3/1982 | Menth et al. |

(Continued)

FOREIGN PATENT DOCUMENTS

| | | | |
|---|---|---|---|
| CN | 104685581 | A | 6/2015 |
| CN | 104916382 | A | 9/2015 |

(Continued)

OTHER PUBLICATIONS

Translation of JP59-023803A. (Year: 1984).*

(Continued)

*Primary Examiner* — Xiaowei Su
(74) *Attorney, Agent, or Firm* — McCoy Russell LLP

(57) ABSTRACT

A rare-earth cobalt permanent magnet having excellent magnetic characteristics, a method for manufacturing such a rare-earth cobalt permanent magnet, and a device including such a rare-earth cobalt permanent magnet are provided. A rare-earth cobalt permanent magnet consisting of 23 to 27 mass % of a rare-earth element R including Sm, 4.0 to 5.0 mass % of Cu, 22 to 27 mass % of Fe, 1.7 to 2.5 mass % of Zr, and a remainder consisting of Co and unavoidable impurities, in which the rare-earth cobalt permanent magnet includes a plurality of crystal grains and grain boundary parts, and a size of a cell structure constituting the crystal grain is 100 to 600 nm.

7 Claims, 4 Drawing Sheets

(51) Int. Cl.

| | |
|---|---|
| ***B22F 3/24*** | (2006.01) |
| ***C22C 1/04*** | (2023.01) |
| ***C22C 19/07*** | (2006.01) |
| ***C22C 30/02*** | (2006.01) |

(56) References Cited

U.S. PATENT DOCUMENTS

| | | | | |
|---|---|---|---|---|
| 6,726,781 | B2 | 4/2004 | Walmer et al. | |
| 9,773,592 | B2 | 9/2017 | Sakurada et al. | |
| 9,774,219 | B2 | 9/2017 | Horiuchi et al. | |
| 10,770,208 | B2 | 9/2020 | Horiuchi et al. | |
| 11,081,264 | B2 | 8/2021 | Horiuchi et al. | |
| 2005/0189042 | A1 | 9/2005 | Ohashi | |
| 2013/0076184 | A1 | 3/2013 | Horiuchi et al. | |
| 2014/0139063 | A1 | 5/2014 | Horiuchi et al. | |
| 2014/0139305 | A1 | 5/2014 | Horiuchi et al. | |
| 2015/0147228 | A1 | 5/2015 | Endo et al. | |
| 2015/0221422 | A1 | 8/2015 | Sakurada et al. | |
| 2015/0262740 | A1 | 9/2015 | Fujiwara et al. | |
| 2015/0270040 | A1* | 9/2015 | Horiuchi | C22C 1/0441 310/152 |
| 2015/0279528 | A1 | 10/2015 | Suzuki | |
| 2015/0380134 | A1* | 12/2015 | Machida | C22C 19/07 335/302 |
| 2016/0086702 | A1 | 3/2016 | Horiuchi et al. | |
| 2017/0002445 | A1 | 1/2017 | Hagiwara et al. | |
| 2017/0162304 | A1 | 6/2017 | Horiuchi et al. | |
| 2017/0271059 | A1* | 9/2017 | Horiuchi | H02K 1/02 |
| 2017/0271060 | A1 | 9/2017 | Takahashi et al. | |
| 2017/0365382 | A1 | 12/2017 | Horiuchi et al. | |
| 2017/0365383 | A1 | 12/2017 | Horiuchi et al. | |
| 2019/0333660 | A1 | 10/2019 | Ito et al. | |
| 2020/0243232 | A1* | 7/2020 | Takezawa | C22C 19/07 |
| 2020/0312497 | A1 | 10/2020 | Muroya et al. | |
| 2020/0365301 | A1* | 11/2020 | Takezawa | B22F 9/08 |
| 2021/0090768 | A1 | 3/2021 | Ishikura et al. | |
| 2021/0249165 | A1 | 8/2021 | Machida et al. | |
| 2023/0095210 | A1 | 3/2023 | Machida et al. | |
| 2023/0253838 | A1 | 8/2023 | Amaya et al. | |
| 2024/0047104 | A1 | 2/2024 | Takezawa et al. | |
| 2024/0212895 | A1 | 6/2024 | Kuniyoshi | |

FOREIGN PATENT DOCUMENTS

| | | | | | |
|---|---|---|---|---|---|
| CN | 107204222 | A | | 9/2017 | |
| CN | 108352231 | A | | 7/2018 | |
| JP | S558468 | A | | 1/1980 | |
| JP | S5563806 | A | | 5/1980 | |
| JP | 59023803 | A | * | 2/1984 | C22C 1/0441 |
| JP | S61220307 | A | | 9/1986 | |
| JP | S61220308 | A | | 9/1986 | |
| JP | 2005243884 | A | | 9/2005 | |
| JP | 2014103239 | A | | 6/2014 | |
| JP | 2015111675 | A | | 6/2015 | |
| JP | 2015188072 | A | | 10/2015 | |
| JP | 2017168827 | A | | 9/2017 | |
| JP | 2018100450 | A | | 6/2018 | |
| JP | 2018147986 | A | | 9/2018 | |
| JP | 2020188140 | A | | 11/2020 | |
| JP | 2021125593 | A | | 8/2021 | |
| WO | 2015140829 | A1 | | 9/2015 | |
| WO | 2016151621 | A1 | | 9/2016 | |
| WO | 2017046827 | A1 | | 3/2017 | |
| WO | WO-2017061126 | A1 | * | 4/2017 | B22F 3/00 |
| WO | 2017158646 | A1 | | 9/2017 | |

OTHER PUBLICATIONS

Machida, AIP Advances 9, 125042 (2019). (Year: 2019).*
Japanese Patent Office, Office Action Issued in Application No. 2020-018900, Aug. 31, 2021, 10 pages. (Submitted with Machine Translation).
Machida, H. et al., "Magnetic properties and microstructures of high heat-resistance Sm-Co magnets with Fe and low Zr content," Proceedings of the 64th Annual Conference on Magnetism and Magnetic Materials, Abstract Published Oct. 28, 2019, Conference held Nov. 7, 2019, Las Vegas, Nevada, 2 pages.
Machida, H. et al., "Magnetic properties and microstructures of high heat-resistance Sm-Co magnets with Fe and low Zr content," AIP Advances, vol. 9, No. 12, Dec. 26, 2019, 6 pages.
Machida, H. et al., "Magnetic Domain Structures and Magnetic Properties of Lightly Nd Doped Sm-Co Magnets with High Squareness and High Heat Resistance," Proceedings of the 21st International Conference on Magnetism (ICM2018), Jul. 15, 2018, San Francisco, California, 4 pages.
Japanese Patent Office, Office Action Issued in Application No. 2019-091966, Nov. 2, 2021, 10 pages. (Submitted with Machine Translation).
United States Patent and Trademark Office, Restriction Requirement Issued in U.S. Appl. No. 16/874,566, filed Dec. 17, 2021, 7 pages.
United States Patent and Trademark Office, Office Action Issued in U.S. Appl. No. 16/874,566, filed Apr. 1, 2022, 18 pages.
United States Patent and Trademark Office, Final Office Action Issued in U.S. Appl. No. 16/874,566, filed Jul. 28, 2022, 9 pages.
United States Patent and Trademark Office, Advisory Action Issued in U.S. Appl. No. 16/874,566, filed Oct. 7, 2022, 4 pages.
United States Patent and Trademark Office, Office Action Issued in U.S. Appl. No. 16/874,566, filed Dec. 13, 2022, 18 pages.
United States Patent and Trademark Office, Final Office Action Issued in U.S. Appl. No. 16/874,566, filed May 15, 2023, 16 pages.
United States Patent and Trademark Office, Advisory Action Issued in U.S. Appl. No. 16/874,566, filed Jul. 25, 2023, 4 pages.
United States Patent and Trademark Office, Non-Final Office Action Issued in U.S. Appl. No. 16/874,566, filed Nov. 22, 2023, 12 pages.
United States Patent and Trademark Office, Final Office Action Issued in U.S. Appl. No. 16/874,566, filed May 13, 2024, 17 pages.
United States Patent and Trademark Office, Advisory Action Issued in U.S. Appl. No. 16/874,566, filed Jul. 26, 2024, 4 pages.
Liu, S. et al., "Magnetic properties and microstructure of light rare earth substituted 2:17 magnets," Journal of Applied Physics, vol. 69, No. 8, Apr. 15, 1991, 4 pages.
United States Patent and Trademark Office, Non-Final Office Action Issued in U.S. Appl. No. 16/874,566, filed Oct. 7, 2024, 12 pages.
United States Patent and Trademark Office, Final Office Action Issued in U.S. Appl. No. 17/935,463, filed Jun. 3, 2025, 26 pages.
Japanese Patent Office, Office Action Issued in Application No. 2021-159333, Jul. 26, 2022, 7 pages. (Submitted with Machine Translation).
United States Patent and Trademark Office, Non-Final Office Action Issued in U.S. Appl. No. 17/935,463, filed Jan. 15, 2025, 24 pages.
China National Intellectual Property Administration, Office Action and Search Report Issued in Application No. 202110156864.2, Jan. 18, 2025, 19 pages. (Submitted with Machine Translation).
United States Patent and Trademark Office, Notice of Allowance Issued in U.S. Appl. No. 16/874,566, filed Feb. 12, 2025, 8 pages.
United States Patent and Trademark Office, Corrected Notice of Allowability Issued in U.S. Appl. No. 16/874,566, filed Apr. 2, 2025, 2 pages.
State Intellectual Property Office of the People's Republic of China, Office Action and Search Report Issued in Application No. 202010403308.6, Mar. 31, 2025, 13 pages. (Submitted with Machine Translation).
United States Patent and Trademark Office, Notice of Allowance Issued in U.S. Appl. No. 16/874,566, filed Jan. 16, 2026, 24 pages.
United States Patent and Trademark Office, Non-Final Office Action Issued in U.S. Appl. No. 18/354,532, Aug. 1, 2025, 16 pages.
United States Patent and Trademark Office, Non-Final Office Action Issued in U.S. Appl. No. 18/354,532, Sep. 16, 2025, 51 pages.
United States Patent and Trademark Office, Non-Final Office Action Issued in U.S. Appl. No. 17/935,463, filed Dec. 5, 2025, 32 pages.
United States Patent and Trademark Office, Final Office Action Issued in U.S. Appl. No. 18/354,532, Mar. 6, 2026, 28 pages.
United States Patent and Trademark Office, Final Office Action Issued in U.S. Appl. No. 17/935,463, May 14, 2026, 28 pages.

* cited by examiner

EXAMPLE 2

COMPARATIVE EXAMPLE 1

RARE-EARTH COBALT PERMANENT MAGNET, MANUFACTURING METHOD THEREFOR, AND DEVICE

CROSS REFERENCE TO RELATED APPLICATION

The present application claims priority to Japanese Patent Application No. 2020-18900 filed on Feb. 6, 2020. The entire contents of the above-listed application is hereby incorporated by reference for all purposes.

BACKGROUND

The present disclosure relates to a rare-earth cobalt permanent magnet, a method for manufacturing a rare-earth cobalt permanent magnet, and a device.

As high-performance permanent magnets, rare-earth cobalt permanent magnets such as Sm—Co magnets have been known. Among such rare-earth cobalt permanent magnets, those containing, for example, Fe, Cu, Zr and the like have been well known because they have various useful features such as improving magnetic characteristics.

For example, Japanese Unexamined Patent Application Publication No. 2015-188072 discloses a rare-earth cobalt permanent magnet having a specific composition containing Sm, Cu, Fe, Zr and Co, and having a metal structure having a cell phase containing a $Sm_2CO_{17}$ phase and a cell wall containing a $SmCo_5$ phase. Further, International Patent Publication No. WO2017/061126 discloses a rare-earth cobalt permanent magnet which has a specific composition containing Sm, Cu, Fe, Zr and Co, and has a metal structure containing a plurality of crystal grains and grain boundary parts, and in which the content of Cu and Zr in the grain boundary parts is higher than the content of Cu and Zr in the crystal grains.

SUMMARY

Rare-earth cobalt permanent magnets have characteristics that enable the changing rate of the magnetic force with respect to the temperature to be small and the permanent magnets to have resistance to rusting, so that they are widely used in various devices. In order to further improve the performance of such devices, there has been a demand for a rare-earth cobalt permanent magnet having more excellent magnetic characteristics.

One of the objects of the present disclosure is to provide a rare-earth cobalt permanent magnet having excellent magnetic characteristics, a method for manufacturing such a rare-earth cobalt permanent magnet, and a device including such a rare-earth cobalt permanent magnet.

A first exemplary aspect is a rare-earth cobalt permanent magnet consisting of 23 to 27 mass % of a rare-earth element R including Sm, 4.0 to 5.0 mass % of Cu, 22 to 27 mass % of Fe, 1.7 to 2.5 mass % of Zr, and a remainder consisting of Co and unavoidable impurities, in which

- the rare-earth cobalt permanent magnet includes a plurality of crystal grains and grain boundary parts, and
- a size of a cell structure constituting the crystal grain is 100 to 600 nm.

In an aspect of the rare-earth cobalt permanent magnet, a degree of orientation of the crystal grains is equal to or smaller than 600 with respect to an easy axis of magnetization.

In an aspect of the rare-earth cobalt permanent magnet, relations $\alpha<0.045\%/°$ C. and $\beta<0.35\%/°$ C. hold at a temperature range of 20 to 200° C., where a and R are temperature coefficients of a residual magnetic flux density Br and an intrinsic coercive force Hcj, respectively.

In an aspect of the rare-earth cobalt permanent magnet, when an intrinsic coercive force is represented by Hcj and a magnitude of a reverse magnetic field when a residual magnetic flux density Br is 90% is represented by Hk, a ratio Hk/Hcj is equal to or higher than 65% under conditions that: a density of the rare-earth cobalt permanent magnet is equal to or higher than 8.25 g/cm$^3$; a maximum energy product (BH)m thereof is equal to or larger than 260 kJ/m$^3$; and the intrinsic coercive force Hcj is equal to or larger than 1,600 kA/m.

Another exemplary aspect is a method for manufacturing a rare-earth cobalt permanent magnet, including:

- a step (I) of preparing an alloy consisting of 23 to 27 mass % of a rare-earth element R including Sm, 4.0 to 5.0 mass % of Cu, 22 to 27 mass % of Fe, 1.7 to 2.5 mass % of Zr, and a remainder consisting of Co and unavoidable impurities;
- a pulverizing step (II) of pulverizing the alloy into a powder;
- a pressure-molding step (III) of pressure-molding the powder into a molded body;
- a sintering step (IV) of heating the molded body and thereby forming a sintered body;
- a step (V) of gradually cooling the sintered body at a temperature decreasing rate of 0.01 to 3° C./min; and
- a solution treatment step (VI) of heating the gradually-cooled sintered body at 1,120 to 1,170° C. for 31 to 120 hours.

In an aspect of the method for manufacturing a rare-earth cobalt permanent magnet, the sintering step (IV) is carried out at 1,180 to 1,220° C. for 20 to 240 minutes.

Further, the present disclosure also provides a device including the above-described rare-earth cobalt permanent magnet.

According to the present disclosure, it is possible to provide a rare-earth cobalt permanent magnet having excellent magnetic characteristics, a method for manufacturing such a rare-earth cobalt permanent magnet, and a device including such a rare-earth cobalt permanent magnet.

The above and other objects, features and advantages of the present disclosure will become more fully understood from the detailed description given hereinbelow and the accompanying drawings which are given by way of illustration only, and thus are not to be considered as limiting the present disclosure.

DETAILED DESCRIPTION

Figure 1:
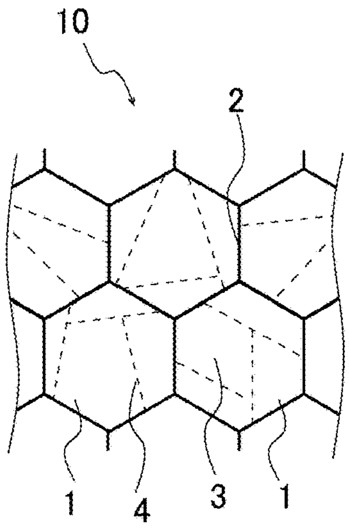
FIG. 1 is a schematic diagram for explaining a structure of a permanent magnet.

A rare-earth cobalt permanent magnet, a method for manufacturing a rare-earth cobalt permanent magnet, and a device according to the present disclosure will be described hereinafter in this order.

Note that a numerical range such as "n-m" or "n to m" (i.e., "from n to m") includes the lower and upper limit values, unless otherwise specified.

Further, an easy axis of magnetization of a rare-earth cobalt permanent magnet is also referred to as a c-axis.

Rare-Earth Cobalt Permanent Magnet

A rare-earth cobalt permanent magnet according to the present disclosure (hereinafter also referred to as the permanent magnet according to the present disclosure or the like, or simply as the permanent magnet) consisting of 23 to 27 mass % of a rare-earth element R including Sm, 4.0 to 5.0 mass % of Cu, 22 to 27 mass % of Fe, 1.7 to 2.5 mass % of Zr, and a remainder consisting of Co and unavoidable impurities, in which the rare-earth cobalt permanent magnet includes a plurality of crystal grains and grain boundary parts, and a size of a cell structure constituting the crystal grain is 100 to 600 nm.

The rare-earth element R is a generic name of Sc, Y, and lanthanoids. Further, in the permanent magnet according to the present disclosure, the rare-earth element R includes at least Sm. By containing the rare-earth element(s) in the aforementioned ratio, it is possible to obtain a permanent magnet having high magnetic anisotropy and a high coercive force. The rare-earth element R may consist of Sm alone, or may be a combination of Sm and other rare-earth elements. The other rare-earth element R is preferably at least one type of an element selected from Nd, Pr and Ce in view of the magnetic characteristic. In view of the magnetic characteristic, the rare-earth element R preferably contains Sm in 70 mass % or more, and more preferably 80 mass % or more based on the whole rare-earth element.

The rare-earth cobalt permanent magnet contains Cu in 4.0 to 5.0 mass %. By containing 4.0 mass % or more of Cu, the rare-earth cobalt permanent magnet becomes a permanent magnet having a high coercive force. Further, by limiting the content of Cu to 5.0 mass % or less, the magnetization is prevented from decreasing.

The rare-earth cobalt permanent magnet contains Fe in 22 to 27 mass %. By adjusting the content of Fe to a value within this range, a cell structure having a cell size of 100 to 600 nm is likely to be formed in a manufacturing method described later. Further, by containing 22% or more of Fe, the saturation magnetization is improved. Further, by limiting the content of Fe to 27% or less, the rare-earth cobalt permanent magnet becomes a permanent magnet having a high coercive force.

Further, the rare-earth cobalt permanent magnet contains Zr in 1.7 to 2.5%. By containing Zr in the aforementioned range, it is possible to obtain a permanent magnet having a high maximum energy product (BH)m, which is a maximum magnetostatic energy that the magnet can hold.

Further, the remainder (i.e., 38.5 to 49.3%) of the permanent magnet is consisting of Co and inevitable impurities.

By containing Co, the thermal stability of the permanent magnet is improved. On the other hand, when the content of Co is too large, the content of Fe is relatively lowered, thus raising a possibility that the magnetization may deteriorate. From these points, the content of Co is preferably 38.5 to 49.3%.

The permanent magnet according to the present disclosure may contain unavoidable impurities in a range in which effects of the present disclosure are not impaired. The unavoidable impurities are elements unavoidably mixed in the permanent magnet from the raw materials or during the manufacturing process. Examples of the unavoidable impurities include, but are not limited to, C (carbon), N (nitrogen), P (phosphorus), S (sulfur), Al (aluminum), Ti (titanium), Cr (chromium), Mn (manganese), Ni (Nickel), Hf (hafnium), Sn (tin), and W (tungsten).

The total containing ratio of unavoidable impurities is preferably 5 mass % or less, more preferably 1 mass % or less, still more preferably 0.1 mass % or less based on the total amount of the rare-earth cobalt permanent magnet.

Next, a structure of the permanent magnet will be described with reference to FIG. 1. FIG. 1 is a schematic cross-sectional diagram showing a part of a cross section of the permanent magnet. As shown in the example shown in FIG. 1, the permanent magnet 10 includes a plurality of crystal grains 1 (areas surrounded by solid lines in the figure), and grain boundary parts 2 (solid lines in the figure) between the crystal grains 1. Each crystal grain 1 has cell phases 3 (areas surrounded only by dotted lines, or dotted lines and solid lines in the figure) containing a crystal phase having a $Th_2Zn_{17}$-type structure (hereinafter also referred to as a "2-17 phase"), and cell walls 4 (dotted lines in the figure) containing a crystal phase having an $RCo_5$-type structure (hereinafter also referred to as a "1-5 phase") and surrounding the cell phases. In the present disclosure, the cell structure is a combination of one cell phase 3 and cell walls 4 surrounding this cell phase, and is a minimum unit constituting a crystal grain. The cell size indicates the length of the cell wall 4 (the length of the long side thereof).

As described above, the permanent magnet has a cell phase having a crystal phase having a $Th_2Zn_{17}$-type structure as a main phase. The $Th_2Zn_{17}$-type structure is a crystal structure having an R-3m-type space group. In the permanent magnet according to the present disclosure, the Th part is occupied by a rare-earth element and Zr, and the Zn part is occupied by Co, Cu, Fe and Zr. Further, as described above, the permanent magnet has a cell wall including a crystal phase having an $RCo_5$-type structure. In the crystal phase having the $RCo_5$-type structure, the R part is occupied by the rare-earth element and Zr, and the Co part is occupied by Co, Cu and Fe.

In the permanent magnet according to the present disclosure, it is inferred that a coercive force is developed as a domain wall is pinned between two phases, i.e., between the 2-17 phase and the 1-5 phase when the domain wall is moved. Further, the permanent magnet is characterized in that the squareness is improved and the maximum energy product (BH)m is increased as Fe and Cu are concentrated in the 2-17 phase and the 1-5 phase, respectively, when the two-phase separation occurs, so that the magnetic characteristic is significantly affected and the composition ratio has a significant influence. Further, the more constant the composition ratio between the 2-17 phase and the 1-5 phase is over the whole permanent magnet, the better magnetic characteristic the permanent magnet can exhibit. Further, in the case where the permanent magnet is processed into small pieces, the yield can be improved.

Since the permanent magnet 10 has a cell size of 100 to 600 nm, it has excellent magnetic characteristics.

The structure of the permanent magnet according to the present disclosure is made uniform through heat treatments such as sintering, gradual cooling/solution treatment, and rapid cooling. Further, the permanent magnet is separated into two phases, i.e., into a 2-17 phase and a 1-5 phase by performing aging. TEM (Transmission Electron Microscopy) and EDX (Energy dispersive X-ray spectrometry) are used for determining the cell size and analyzing the composition. The TEM is a technique in which a thin sample is observed by irradiating it with an electron beam and thereby forming an image thereof by electrons that have passed therethrough. The EDX is a technique for identifying an element(s) by detecting the energy and the intensity of characteristic X-rays that are emitted when a sample is irradiated with an electron beam.

Figure 2:
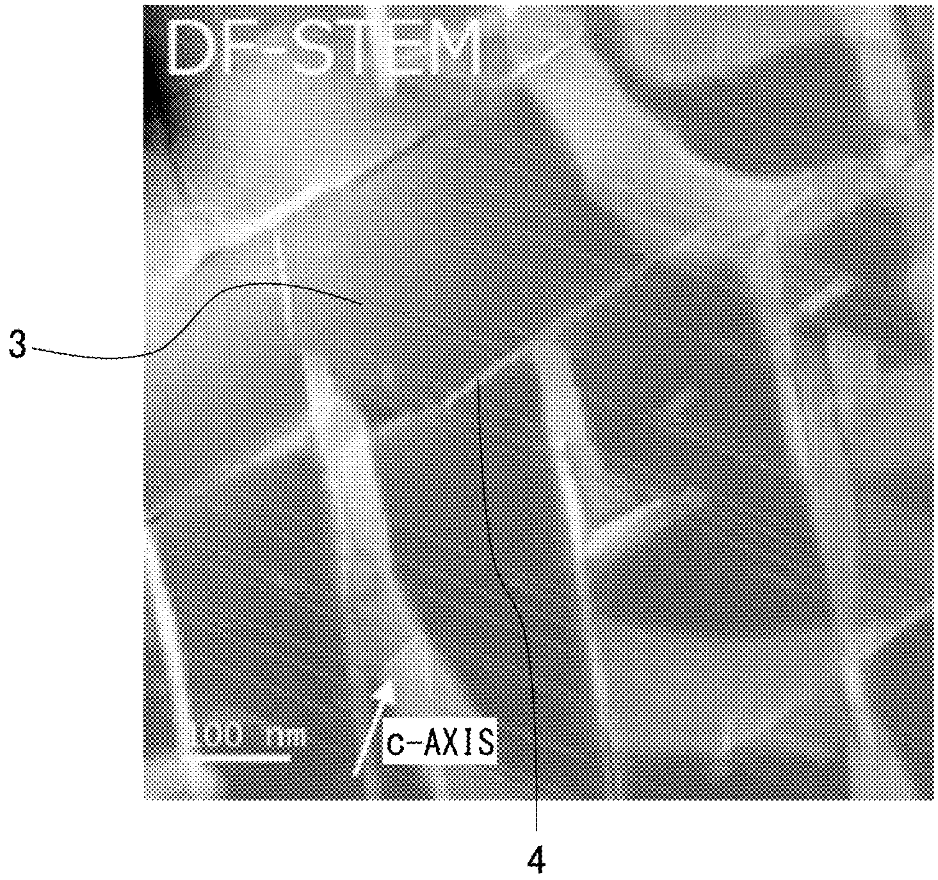
FIG. 2 is a TEM (Transmission Electron Microscopy) image showing a cell structure of a rare-earth cobalt permanent magnet according to an Example 2.
Figure 3:
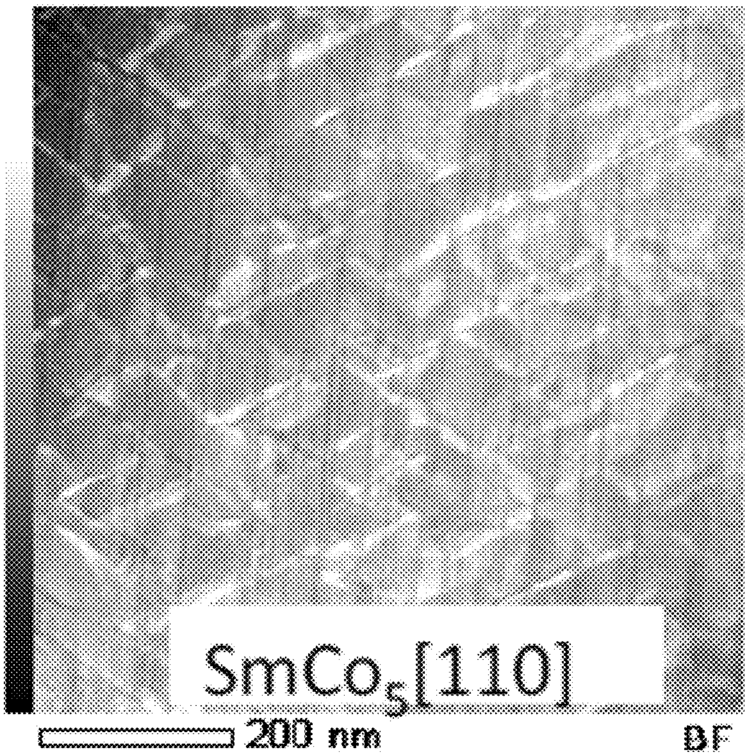
FIG. 3 is a TEM image showing a cell structure of a rare-earth cobalt permanent magnet according to a Comparative Example 1.

FIG. 2 is a TEM image of a rare-earth cobalt permanent magnet according to an Example 2 which will be described later. Further, FIG. 3 is a TEM image of a rare-earth cobalt permanent magnet according to a Comparative Example 1 which will be described later. Each of FIGS. 2 and 3 shows some of the crystal grains 1. As shown in FIG. 2, cell phases 3 and cell walls 4 surrounding the cell phases are observed. Further, as understood from the comparison between FIG. 2 and FIG. 3, in the permanent magnet according to the example, one having a relatively large cell size of 100 to 600 nm is formed by a manufacturing method which will be described later, and hence the permanent magnet has excellent magnetic characteristics.

Further, the inventors of the present application have paid attention to the degree of orientation as an index for achieving excellent magnetic characteristics. The degree of orientation is directly related to the magnitude of the magnetization and is an essential factor to discuss the magnetic characteristic. The degree of orientation is a physical quantity indicating how much the magnetization of the magnetic material is directed (i.e., oriented) to the direction of the easy magnetization. In particular, when the degree of orientation of crystal grains is equal to or smaller than 600 with respect to the axis of the easy magnetization, the residual magnetic flux density Br and the squareness ratio Hk/Hcj tend to increase. In particular, the degree of orientation of crystal grains is preferably equal to or smaller than 550 and more preferably equal to or smaller than 50° with respect to the axis of the easy magnetization. According to the manufacturing method in accordance with the present disclosure which will be described later, it has become evident that it is likely that a permanent magnet in which the degree of orientation of crystal grains is equal to or smaller than 60° with respect to the axis of the easy magnetization is obtained.

Examples of the means for examining the degree of orientation include an EBSD (Electron BackScatter Diffraction Pattern) method. In the EBSD method, for example, when an electron beam is applied to a cross section of the permanent magnet at an incident angle of about 60 to 70°, a diffracted electron beam is obtained in each crystal plane in an area of about 50 nm or shorter from the cross section. Information about an analysis of orientation of the crystal grains can be obtained by analyzing backscattered electron diffraction generated from these diffracted electron beams.

Figure 5:
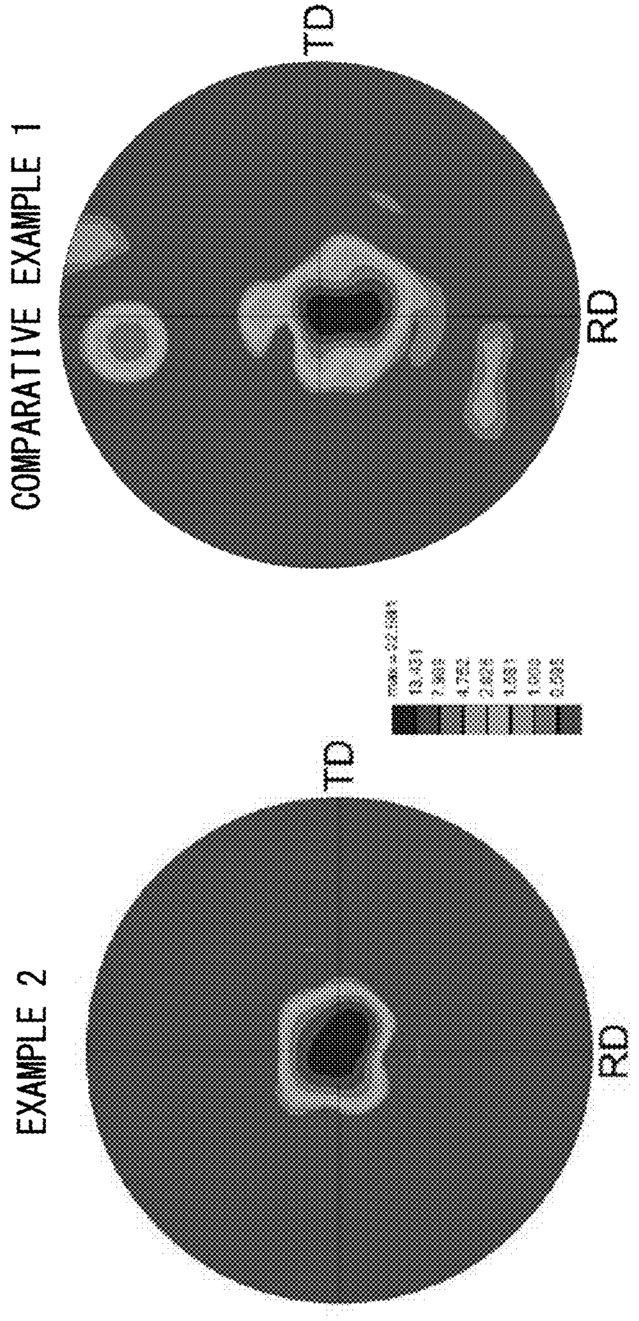
FIG. 5 shows results of measurements of degrees of orientation of rare-earth cobalt permanent magnets according to the Example 2 and the Comparative Example 1.

FIG. 5 shows results of measurements of degrees of orientation of a rare-earth cobalt permanent magnet according to the Example 2 (left) and those of the Comparative Example 1 (right). In FIG. 5, it can be evaluated (i.e., considered) that the more the diffracted electron beams are concentrated at the center of the circle, the higher the degree of orientation is. As shown in FIG. 5, the diffracted electron beams in the Example 2 are concentrated at the center of the circle, and it means that the degree of orientation of the crystal grains has been able to be restrained to a range equal to or smaller than 600 with respect to the axis of the easy magnetization. On the other hand, in the Comparative Example 1, the diffracted electron beams are diffused (or scattered) to the peripheral area, and the degree of orientation is low. As described above, the permanent magnet according to the example has a high degree of orientation of crystal grains, and has a high residual magnetic flux density Br and a high squareness ratio Hk/Hcj.

Further, the inventors paid attention to the temperature coefficients of the residual magnetic flux density Br and the intrinsic coercive force Hcj. The temperature coefficient is a coefficient indicating a change in the residual magnetic flux density Br or the intrinsic coercive force Hcj over a temperature change of 1° C. Here, let a and 3 stand for the temperature coefficients of the residual magnetic flux density Br and the intrinsic coercive force Hcj, respectively. Then, by adjusting these temperature coefficients so that relations $\alpha<0.045\%/^\circ$ C. and $\beta<0.35\%/^\circ$ C., preferably $\alpha<0.040\%$ and $\beta<0.30\%/^\circ$ C. hold at a temperature range of 20 to 200° C., changes in the magnetic characteristic of the permanent magnet in this temperature range are reduced and hence a permanent magnet having excellent temperature stability is obtained. According to the manufacturing method described later, it is likely that a permanent magnet that satisfies the above-described relation between the temperature coefficients is obtained.

Method for Manufacturing Rare-Earth Cobalt Permanent Magnet

A method for manufacturing a rare-earth cobalt permanent magnet according to the present disclosure (hereinafter also referred to as the manufacturing method according to the present disclosure or the like, or simply as the manufacturing method) includes:

- a step (I) of preparing an alloy consisting of 23 to 27 mass % of a rare-earth element R including Sm, 4.0 to 5.0 mass % of Cu, 22 to 27 mass % of Fe, 1.7 to 2.5 mass % of Zr, and a remainder consisting of Co and unavoidable impurities;
- a pulverizing step (II) of pulverizing the alloy into a powder;
- a pressure-molding step (III) of pressure molding the powder into a molded body;
- a sintering step (IV) of heating the molded body and thereby forming a sintered body;
- a step (V) of gradually cooling the sintered body at a temperature decreasing rate of 0.01 to 3° C./min; and
- a solution treatment step (VI) of heating the gradually-cooled sintered body at 1,120 to 1,170° C. for 31 to 120 hours.

Figure 4:
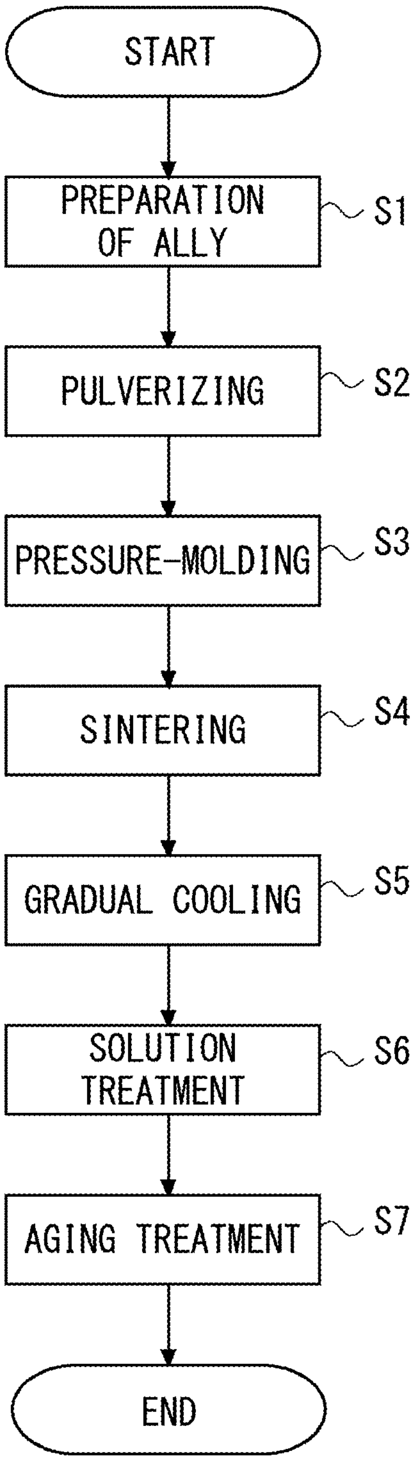
FIG. 4 is a flowchart for explaining an embodiment of a manufacturing method.

According to the above-described manufacturing method, it is possible to manufacture a rare-earth cobalt permanent magnet including a plurality of crystal grains and grain boundary parts, in which the size of cell structures constituting the crystal grains is 100 to 600 nm. Each of the steps in the method for manufacturing a rare-earth cobalt permanent magnet according to this embodiment will be described hereinafter with reference to a flowchart shown in FIG. 4.

Firstly, an alloy consisting of 23 to 27 mass % of a rare-earth element R including Sm, 4.0 to 5.0 mass % of Cu, 22 to 27 mass % of Fe, 1.7 to 2.5 mass % of Zr, and a remainder consisting of Co and unavoidable impurities is prepared (step S1: step (I)). The method for preparing the alloy is not limited to any particular method. For example, the alloy may be prepared by obtaining a commercially-available alloy having a desired composition, or by blending the aforementioned elements so that a desired composition is obtained.

A specific example of the blending of the elements will be described hereinafter, but the present disclosure is not limited to this example method.

Firstly, a desired rare-earth element(s), each of metal elements of Fe, Cu and Co, and a base alloy are prepared as ingredients. Note that it is preferable to select, as the base alloy, one having a composition having a low eutectic temperature because, by doing so, it is easy to make the composition of the obtained alloy uniform. In this manufacturing method, FeZr or CuZr is preferably selected and used as the base alloy. As an example of FeZr, one containing about 20% of Fe and about 80% of Zr is suitable. Further, as an example of CuZr, one containing about 50% of Cu and 50% of Zr is suitable.

It is possible to obtain a homogeneous alloy by blending the aforementioned ingredients so as to have a desired composition, putting the blend in a crucible made of Al or the like, and dissolving the blend in a vacuum of $1\times10^{-2}$ torr or lower, or in an inert-gas atmosphere by using a high-frequency melting furnace. Further, the present disclosure may include a step of casting the molten alloy by using a mold and thereby obtaining an alloy ingot. Alternatively, as a different method, a flaky alloy having a thickness of about 1 mm may be manufactured by dropping the molten alloy onto a copper roll (a strip casting method).

In the case of forming an alloy ingot by the above-described casting, the manufacturing method preferably includes, before the step (II) (which will be described later), a step of heat-treating the alloy ingot at a solution-treatment temperature for no shorter than one hour and no longer than 20 hours. It is possible, by this step, to make the composition more uniform. Note that the solution-treatment temperature for the alloy ingot may be adjusted as appropriate according to the composition and the like of the alloy.

Next, the alloy is pulverized into a powder (step S2: step (II)). The method for pulverizing the alloy is not limited to any particular method, and may be selected as appropriate from known methods. As an example, the alloy ingot or the flake alloy is first coarsely pulverized to a size of about 100 to 500 μm by a known pulverizing machine, and then finely pulverized by a ball mill or a jet mill. Although the average particle diameter of the powder is not limited to any particular value, the alloy ingot or the flake alloy may be pulverized to a powder having an average particle diameter of no smaller than 1 μm and no larger than 10 μm, and preferably about 6 μm so that the sintering time of the sintering step (which will be described later) can be shortened and a homogeneous permanent magnet can be manufactured.

Next, the obtained powder is pressure-molded, so that a molded body having a desired shape is obtained (step S3: step (III)). In the manufacturing method according to the present disclosure, the obtained powder is preferably pressure-molded in a constant magnetic field in order to align the orientation of crystals and thereby to improve the magnetic characteristic. There is no particular restriction on the relation between the direction of the magnetic field and the pressing direction, and the relation may be selected as appropriate according to the shape and the like of the product. For example, when a ring magnet or a thin plate-like magnet is manufactured, it is possible to use parallel magnetic-field pressing in which a magnetic field is applied in a direction parallel to the pressing direction. On the other hand, in order to achieve excellent magnetic characteristics, it is preferable to use right-angle magnetic-field pressing in which a magnetic field is applied at a right angle with respect to the pressing direction.

The magnitude of the magnetic field is not limited to any particular value, and the magnetic field may be, for example, a magnetic field of 15 kOe or weaker, or a magnetic field of 15 kOe or larger depending on the use and the like of the product. However, in order to achieve excellent magnetic characteristics, it is preferable to perform the pressure-molding in a magnetic field of 15 kOe or larger. Further, the pressure in the pressure molding may be adjusted as appropriate according to the size, the shape, and the like of the product. As an example, the pressure may be 0.5 to 2.0 ton/cm$^2$. That is, in the method for manufacturing a rare-earth cobalt permanent magnet according to the present disclosure, in order to achieve excellent magnetic characteristics, it is particularly preferable that the powder is press-molded in a magnetic field of 15 kOe or larger while applying a pressure of no lower than 0.5 ton/cm$^2$ and no higher than 2.0 ton/cm$^2$ perpendicularly to the magnetic field.

Next, the molded body is heated, so that a sintered body is obtained (step S4: step (IV)).

In this manufacturing method according to the present disclosure, the conditions for the sintering can be arbitrarily determined as long as the obtained sintered body is sufficiently densified. For example, known conditions may be used. In order to densify the sintered body, the sintering temperature is preferably 1,180 to 1,220° C. By adjusting the temperature to 1,220° C. or lower, the rare-earth elements, particularly Sm, are prevented from evaporating, and hence a permanent magnet having excellent magnetic characteristics can be manufactured. The sintering time is preferably 20 to 240 minutes, and more preferably 30 to 180 minutes in order to sufficiently densify the sintered body while preventing Sm from evaporating. Further, in order to prevent the oxidation, the above-described sintering step is preferably performed in a vacuum of 10 Pa or lower, or in an inert-gas atmosphere, and more preferably performed in a vacuum of 10 Pa or lower.

Next, the obtained sintered body is gradually cooled at a temperature decreasing rate of 0.01 to 3° C./min (step S5: step (V)). By slowly and gradually cooling at a temperature decreasing rate of 3° C./min or lower, it is likely that cell structures having cell walls of 100 to 600 nm are formed in the crystal grains. Further, a temperature decreasing rate of 0.01° C./min is more than sufficient as the lower limit of the temperature decreasing rate, but it is preferably 0.05° C./min or higher in view of the manufacturing speed. The temperature is decreased to a solution-treatment temperature at which the solution-treatment step (which will be described below) is performed.

Next, the gradually-cooled sintered body is subjected to the solution treatment in which the sintered body is heated at 1,120 to 1,170° C. for 31 to 120 hours (step S6: step (VI)). In order to improve the productivity while achieving the cell size of 100 to 600 nm, in general, it is preferable that the above-described steps (IV) to (VI) are performed as a series of steps.

By heating the sintered body at 1,120° C. or higher, the composition of the molded body can be made uniform and the aforementioned 1-7 phase, which is a precursor for making the crystal phase of the $Th_2Zn_{17}$-type structure become the main phase, can be formed during an aging-treatment step (which will be described later). However, if the heating temperature exceeds 1,170° C., the 1-7 phase is, on the contrary, less likely to be formed and the evaporation of the rare-earth element may be advanced. Since the optimum solution-treatment temperature of the sintered body changes according to the composition of the sintered body, it is preferable to adjust the heating temperature as appropriate within the aforementioned temperature range.

Further, in order to sufficiently form the 1-7 phase and adjust the cell size to 100 to 600 nm, the solution-treatment time is adjusted to 31 hours or longer. On the other hand, in order to prevent Sm from evaporating and adjust the cell size to 100 to 600 nm, the solution-treatment time is adjusted to 120 hours or shorter. When the solution-treatment time is shorter than 31 hours or is longer than 120 hours, the cell size tends to decrease.

Through the above-described steps, it is possible to manufacture a rare-earth cobalt permanent magnet including a plurality of crystal grains and grain boundary parts, in which the size of cell structures constituting the crystal grains is 100 to 600 nm. The manufacturing method may further include other steps as required. As the other step, the manufacturing method preferably includes an aging treatment step (S7) for the rare-earth cobalt permanent magnet after the solution treatment.

By performing the aging treatment, the 2-17 phase cell phases and the 1-5 phase cell walls are formed more likely. The aging temperature is not limited to any particular temperature. However, in order to obtain a rare-earth cobalt permanent magnet including crystal grains having cell structures of 100 to 600 nm more easily, it is preferable to hold the permanent magnet at a temperature of no lower than 700° C. and no higher than 900° C. for no shorter than two hours and no longer than 20 hours, and then adjust the cooling rate to 2° C./min or lower until the permanent magnet is cooled to 400° C. or lower. By holding the permanent magnet at a temperature of no lower than 700° C. and no higher than 900° C. for no shorter than two hours and no longer than 20 hours, it is likely that the cell size is maintained. In particular, it is preferable to perform the aging treatment in a temperature range of no lower than 800° C. and no higher than 850° C. or less. Further, in order to obtain excellent magnetic characteristics, the cooling rate is preferably adjusted to 2° C./min or lower, and more preferably 0.5° C./min or lower. If the cooling rate is too high, the elements are not concentrated into the 2-17 and 1-5 phases, and hence excellent magnetic characteristics cannot be obtained.

The step (VI) and the aging treatment are preferably performed as a series of steps. In this case, the cooling method that is performed between the step (VI) and the aging treatment is not limited to any particular method. However, it is preferable to rapidly cool the permanent magnet at a cooling rate of 60° C./min or higher in order to maintain the obtained cell size. In particular, it is possible to maintain the cell size by shortening the time in which the temperature of the permanent magnet decreases from the solution-treatment temperature to 600° C. The cooling rate of the rapid cooling may be 60° C./min or higher, preferably 70° C./min or higher, and more preferably 80° C./min or higher. Further, the upper limit of the cooling rate of the rapid cooling is preferably, as an example, 250° C./min or lower, though it depends on the shape of the molded body.

According to the manufacturing method in accordance with the present application, it is possible to obtain, from an ingot having a predetermined composition, a rare-earth cobalt permanent magnet in which the size of cell structures constituting crystal grains is 100 to 600 nm, and the degree of orientation of the crystal grains is likely to be equal to or smaller than 600 with respect to the axis of the easy magnetization. Further, the permanent magnet has the following excellent magnetic characteristics. That is, in the permanent magnet, it is likely that relations $\alpha<0.045\%/°$ C. and $\beta<0.35\%/°$ C. hold at a temperature range of 20 to 200° C., where $\alpha$ and $\beta$ are temperature coefficients of a residual magnetic flux density Br and an intrinsic coercive force Hcj, respectively. Further, when an intrinsic coercive force is represented by Hcj and a magnitude of a reverse magnetic field when a residual magnetic flux density Br is 90% is represented by Hk, a ratio Hk/Hcj is equal to or higher than 65% under conditions that: a density of the rare-earth cobalt permanent magnet is equal to or higher than 8.25 $g/cm^3$; a maximum energy product (BH)m thereof is equal to or larger than 260 $kJ/m^3$; and the intrinsic coercive force Hcj is equal to or larger than 1,600 kA/m.

Device

The present disclosure further provides a device including the above-described permanent magnet. Examples of such a device include clocks (watches), electric motors, various instruments, communication apparatuses, computer terminals, speakers, video discs, and sensors. Further, since the magnetic force of a rare-earth cobalt permanent magnet according to the present disclosure is less likely to deteriorate even at a high environmental temperature, it can be suitably used for an angle sensor, an ignition coil, a driving motor such as one used in an HEV (Hybrid Electric Vehicle), and the like used in an engine room of an automobile.

EXAMPLE

The present disclosure will be described hereinafter in a concrete manner with reference to examples and comparative examples. Note that the present disclosure is not limited by the descriptions of examples below.

Examples 1 to 5

Base alloys each containing 20% of Fe and 80% of Zr, and various ingredients were prepared so that compositions of Examples 1 to 5 shown in the Table 1 were obtained. Then, they were dissolved by a high-frequency melting furnace, and the melt was cast into alloy ingots.

Next, the obtained base alloy was coarsely pulverized so that the average diameter became about 100 to 500 μm in an inert gas, and then finely pulverized into a powder so that the average diameter became about 6 μm in an inert gas by using a ball mill. Molded bodies were obtained by pressing this powder in a magnetic field of 15 kOe with a pressure of 1 $ton/cm^2$.

These molded bodies were heated in a vacuum of 10 Pa or lower at a rate of 5° C./min from degassing to a sintering temperature, and then sintered at 1,210° C. for 100 minutes. After the sintering, the temperature was subsequently lowered to a solution-treatment temperature of 1,140° C. at a temperature decreasing rate of 0.5° C./min, and solution treatment was performed at the solution-treatment temperature for 35 hours. After the solution treatment, the sintered body was kept at 850° C. for 12 hours and an aging treatment was performed under the condition that the sintered body was gradually cooled to 350° C. at a cooling rate of 0.5° C./min. Through these steps, rare-earth cobalt permanent magnets according to the Example 1 to 5 were obtained.

Comparative Examples 1 and 2

Rare-earth cobalt permanent magnets according to Comparative Examples 1 and 2 were obtained in the same manner as in the above-described Example 1, except that the compositions of the ingots were changed to those of the Comparative Example 1 and 2 shown in the Table 1.

Examples 6 to 11

Base alloys each containing 20% of Fe and 80% of Zr, and various ingredients were prepared so that compositions of Examples 6 to 11 shown in the Table 2 were obtained. Then, they were dissolved by a high-frequency melting furnace, and the melt was cast into alloy ingots.

Next, the obtained base alloy was coarsely pulverized so that the average diameter became about 100 to 500 μm in an inert gas, and then finely pulverized into a powder so that the average diameter became about 6 μm in an inert gas by using a ball mill. Molded bodies were obtained by pressing this powder in a magnetic field of 15 kOe with a pressure of 1 ton/cm$^2$.

These molded bodies were heated in a vacuum of 10 Pa or lower at a rate of 4° C./min from degassing to a sintering temperature, and then sintered at a sintering temperature shown in a Table 2 for a sintering time shown in the Table 2. After the sintering, the temperature was subsequently lowered to a solution-treatment temperature at a temperature decreasing rate shown in the Table 2, and solution treatment was performed at a solution-treatment temperature shown in the Table 2 for a solution-treatment time shown in the Table 2. After the solution treatment, the sintered body was kept at 850° C. for 10 hours and an aging treatment was performed under the condition that the sintered body was gradually cooled to 350° C. at a cooling rate of 0.5° C./min. Through these steps, rare-earth cobalt permanent magnets according to the Example 6 to 11 were obtained.

Examples 12 to 16

Base alloys each containing 20% of Fe and 80% of Zr, and various ingredients were prepared so that compositions of Examples 12 to 16 shown in the Table 3 were obtained. Then, they were dissolved by a high-frequency melting furnace, and the melt was cast into alloy ingots.

Next, the obtained base alloy was coarsely pulverized so that the average diameter became about 100 to 500 μm in an inert gas, and then finely pulverized into a powder so that the average diameter became about 6 μm in an inert gas by using a ball mill. Molded bodies were obtained by pressing this powder in a magnetic field of 15 kOe with a pressure of 1 ton/cm$^2$.

These molded bodies were heated in a vacuum of 10 Pa or lower at a rate of 3° C./min from degassing to a sintering temperature, and then sintered at a sintering temperature shown in a Table 3 for a sintering time shown in the Table 3. After the sintering, the temperature was subsequently lowered to a solution-treatment temperature at a temperature decreasing rate shown in the Table 3, and solution treatment was performed at a solution-treatment temperature shown in the Table 3 for a solution-treatment time shown in the Table 3. After the solution treatment, the sintered body was kept at 850° C. for 10 hours and an aging treatment was performed under the condition that the sintered body was gradually cooled to 350° C. at a cooling rate of 0.5° C./min. Through these steps, rare-earth cobalt permanent magnets according to the Example 12 to 16 were obtained.

Examples 17 to 20

Base alloys each containing 20% of Fe and 80% of Zr, and various ingredients were prepared so that compositions of Examples 17 to 20 shown in the Table 4 were obtained. Then, they were dissolved by a high-frequency melting furnace, and the melt was cast into alloy ingots.

Next, the obtained base alloy was coarsely pulverized so that the average diameter became about 100 to 500 μm in an inert gas, and then finely pulverized into a powder so that the average diameter became about 6 μm in an inert gas by using a ball mill. Molded bodies were obtained by pressing this powder in a magnetic field of 15 kOe with a pressure of 1 ton/cm$^2$.

These molded bodies were heated in a vacuum of 10 Pa or lower at a rate of 2° C./min from degassing to a sintering temperature, and then sintered at a sintering temperature shown in a Table 4 for a sintering time shown in the Table 4. After the sintering, the temperature was subsequently lowered to a solution-treatment temperature at a temperature decreasing rate shown in the Table 4, and solution treatment was performed at a solution-treatment temperature shown in the Table 4 for a solution-treatment time shown in the Table 4. After the solution treatment, the sintered body was kept at 850° C. for 10 hours and an aging treatment was performed under the condition that the sintered body was gradually cooled to 350° C. at a cooling rate of 0.5° C./min. Through these steps, rare-earth cobalt permanent magnets according to the Example 17 to 20 were obtained.

Comparative Example 3

A rare-earth cobalt permanent magnet according to a Comparative Example 3 was obtained in the same manner as in the Example 17, except that the solution-treatment temperature was changed to 1,110° C.

Examples 21 to 23

Base alloys each containing 20% of Fe and 80% of Zr, and various ingredients were prepared so that compositions of Examples 21 to 23 shown in the Table 5 were obtained. Then, they were dissolved by a high-frequency melting furnace, and the melt was cast into alloy ingots.

Next, the obtained base alloy was coarsely pulverized so that the average diameter became about 100 to 500 μm in an inert gas, and then finely pulverized into a powder so that the average diameter became about 6 μm in an inert gas by using a ball mill. Molded bodies were obtained by pressing this powder in a magnetic field of 15 kOe with a pressure of 1 ton/cm$^2$.

These molded bodies were heated in a vacuum of 10 Pa or lower at a rate of 5° C./min from degassing to a sintering temperature, and then sintered at a sintering temperature shown in a Table 5 for a sintering time shown in the Table 5. After the sintering, the temperature was subsequently lowered to a solution-treatment temperature at a temperature decreasing rate shown in the Table 5, and solution treatment was performed at a solution-treatment temperature shown in the Table 5 for a solution-treatment time shown in the Table 5. After the solution treatment, the sintered body was kept at 850° C. for 10 hours and an aging treatment was performed under the condition that the sintered body was gradually cooled to 350° C. at a cooling rate of 0.5° C./min. Through these steps, rare-earth cobalt permanent magnets according to the Example 21 to 23 were obtained.

Comparative Examples 4 to 5

Rare-earth cobalt permanent magnets at Comparative Examples 4 and 5 were obtained in the same manner as in the Example 21, except that the sintering time, the solution-treatment time, and the temperature decreasing rate were changed as shown in a Table 5.

Example 24 to 33

Rare-earth cobalt permanent magnets at Examples 24 to 33 were obtained in the same manner as in the Example 1, except that the composition of the ingot, the sintering condition, the solution-treatment condition, and the temperature decreasing rate were changed as shown in a Table 6.

Comparative Example 6 to 14

Rare-earth cobalt permanent magnets at Comparative Examples 6 to 14 were obtained in the same manner as in the Example 1, except that the composition of the ingot, the sintering condition, the solution-treatment condition, and the temperature decreasing rate were changed as shown in a Table 6.

Evaluation of Rare-Earth Cobalt Permanent Magnet

The magnetic characteristics of the rare-earth cobalt permanent magnets obtained in the above-described Examples and Comparative Examples, which were kept as the molded bodies, were measured. The magnetic characteristics were measured by using a B—H tracer. The obtained magnetic characteristics, which were maximum energy products (BH) m, coercive forces (Hcj), and squareness ratios expressed as ratios (Hk/Hcj) between the magnetic fields (Hk) and the coercive forces (Hcj), were measured. Tables 1 to 6 show the results. Further, samples having the same compositions as those of the rare-earth cobalt permanent magnets according to the Examples and the Comparative Examples, which were manufactured at the same time as those according to the Examples and the Comparative Examples, were processed as appropriate. Then, they were observed by using a transmission electron microscope (TEM) and their compositions were analyzed. Further, their degrees of orientation, temperature coefficients, and densities were also measured. Tables 1 to 6 show the results.

TABLE 1

| | Composition (mass %) | Sintering temperature [° C.] | Sintering time [min] | Solution-treatment temperature [° C.] | Solution-treatment time [h] | Temperature decreasing rate [° C.]/min] | Density [g/cm$^3$] | (BH)m [kJ/m$^3$] |
|---|---|---|---|---|---|---|---|---|
| Example 1 | $Sm_{23.5}Fe_{22.0}Cu_{4.50}Zr_{2.15}Co_{bal}$ | 1210 | 100 | 1140 | 35 | 0.5 | 8.25 | 265 |
| Example 2 | $Sm_{23.5}Fe_{24.5}Cu_{4.50}Zr_{2.15}Co_{bal}$ | 1210 | 100 | 1140 | 35 | 0.5 | 8.3 | 275 |
| Example 3 | $Sm_{23.5}Fe_{27.0}Cu_{4.50}Zr_{2.15}Co_{bal}$ | 1210 | 100 | 1140 | 35 | 0.5 | 8.35 | 270 |
| Example 4 | $Sm_{22.5}Nd_{1.0}Fe_{27.0}Cu_{4.50}Zr_{2.15}Co_{bal}$ | 1210 | 100 | 1140 | 35 | 0.5 | 8.3 | 280 |
| Example 5 | $Sm_{26.0}Nd_{1.0}Fe_{27.0}Cu_{4.00}Zr_{2.15}Co_{bal}$ | 1210 | 100 | 1140 | 35 | 0.5 | 8.25 | 275 |
| Comparative Example 1 | $Sm_{23.5}Fe_{20.0}Cu_{4.50}Zr_{2.15}Co_{bal}$ | 1210 | 100 | 1140 | 35 | 0.5 | 8.4 | 250 |
| Comparative Example 2 | $Sm_{23.5}Fe_{29.0}Cu_{4.50}Zr_{2.15}Co_{bal}$ | 1210 | 100 | 1140 | 35 | 0.5 | 8.2 | 255 |

| | Hcj [kA/m] | Hk/Hcj [%] | α [%/° C.] | β [%/° C.] | Cell size [nm] | Maximum angle of deviation from c-axis [°] |
|---|---|---|---|---|---|---|
| Example 1 | 2000 | 70 | 0.025 | 0.27 | 100 | 55 |
| Example 2 | 1850 | 73 | 0.03 | 0.3 | 400 | 45 |
| Example 3 | 1700 | 68 | 0.035 | 0.33 | 550 | 40 |
| Example 4 | 1625 | 75 | 0.035 | 0.31 | 600 | 37 |
| Example 5 | 1600 | 70 | 0.037 | 0.34 | 500 | 45 |
| Comparative Example 1 | 2250 | 64 | 0.025 | 0.25 | 50 | 90 |
| Comparative Example 2 | 1380 | 45 | 0.04 | 0.36 | 85 | 70 |

TABLE 2

| | Composition (mass %) | Sintering temperature [° C.] | Sintering time [min] | Solution-treatment temperature [° C.] | Solution-treatment time [h] | Temperature decreasing rate [° C.]/min] | Density [g/cm$^3$] | (BH)m [kJ/m$^3$] |
|---|---|---|---|---|---|---|---|---|
| Example 6 | $Sm_{24.0}Fe_{26.5}Cu_{4.45}Zr_{2.45}Co_{bal}$ | 1180 | 80 | 1135 | 40 | 1 | 8.25 | 260 |
| Example 7 | $Sm_{24.0}Fe_{26.5}Cu_{4.45}Zr_{2.45}Co_{bal}$ | 1200 | 80 | 1135 | 40 | 1 | 8.28 | 270 |
| Example 8 | $Sm_{24.0}Fe_{26.5}Cu_{4.45}Zr_{2.45}Co_{bal}$ | 1220 | 80 | 1135 | 40 | 1 | 8.29 | 275 |
| Example 9 | $Sm_{20.0}N_{4.0}Fe_{26.5}Cu_{4.45}Zr_{2.45}Co_{bal}$ | 1220 | 80 | 1135 | 40 | 1 | 8.25 | 265 |
| Example 10 | $Sm_{20.0}N_{4.0}Fe_{26.5}Cu_{4.45}Zr_{2.45}Co_{bal}$ | 1220 | 80 | 1135 | 40 | 1 | 8.25 | 265 |
| Example 11 | $Sm_{24.0}Fe_{26.5}Cu_{4.45}Zr_{2.45}Co_{bal}$ | 1230 | 80 | 1135 | 40 | 1 | 8.23 | 220 |

TABLE 2-continued

| | Hcj [kA/m] | Hk/Hcj [%] | α [%/° C.] | β [%/° C.] | Cell size [nm] | Maximum angle of deviation from c-axis [°] |
|---|---|---|---|---|---|---|
| Example 6 | 1650 | 70 | 0.037 | 0.33 | 250 | 51 |
| Example 7 | 1825 | 72 | 0.036 | 0.31 | 550 | 42 |
| Example 8 | 1700 | 68 | 0.039 | 0.34 | 400 | 44 |
| Example 9 | 1600 | 71 | 0.038 | 0.33 | 450 | 50 |
| Example 10 | 1630 | 66 | 0.039 | 0.34 | 400 | 58 |
| Example 11 | 1200 | 37 | 0.042 | 0.37 | 300 | 71 |

TABLE 3

| | Composition (mass %) | Sintering temperature [° C.] | Sintering time [min] | Solution-treatment temperature [° C.] | Solution-treatment time [h] | Temperature decreasing rate [° C.]/min] | Density [g/cm³] | (BH)m [kJ/m³] |
|---|---|---|---|---|---|---|---|---|
| Example 12 | $Sm_{25.0}Fe_{25.5}Cu_{4.60}Zr_{2.00}Co_{bal}$ | 1200 | 20 | 1140 | 80 | 2 | 8.25 | 255 |
| Example 13 | $Sm_{25.0}Fe_{25.5}Cu_{4.60}Zr_{2.00}Co_{bal}$ | 1200 | 135 | 1140 | 80 | 2 | 8.3 | 265 |
| Example 14 | $Sm_{25.0}Fe_{25.5}Cu_{4.60}Zr_{2.00}Co_{bal}$ | 1200 | 240 | 1140 | 80 | 2 | 8.32 | 260 |
| Example 15 | $Sm_{22.0}Pr_{3.0}Fe_{25.5}Cu_{4.60}Zr_{2.00}Co_{bal}$ | 1200 | 240 | 1140 | 80 | 2 | 8.27 | 260 |
| Example 16 | $Sm_{25.0}Fe_{25.5}Cu_{4.60}Zr_{2.00}Co_{bal}$ | 1200 | 250 | 1140 | 80 | 2 | 8.32 | 255 |

| | Hcj [kA/m] | Hk/Hcj [%] | α [%/° C.] | β [%/° C.] | Cell size [nm] | Maximum angle of deviation from c-axis [°] |
|---|---|---|---|---|---|---|
| Example 12 | 1980 | 70 | 0.035 | 0.32 | 120 | 54 |
| Example 13 | 1850 | 73 | 0.038 | 0.33 | 350 | 40 |
| Example 14 | 1615 | 66 | 0.037 | 0.34 | 450 | 46 |
| Example 15 | 1605 | 69 | 0.039 | 0.34 | 400 | 59 |
| Example 16 | 1450 | 50 | 0.041 | 0.36 | 460 | 67 |

TABLE 4

| | Composition (mass %) | Sintering temperature [° C.] | Sintering time [min] | Solution-treatment temperature [° C.] | Solution-treatment time [h] | Temperature decreasing rate [° C.]/min] | Density [g/cm³] | (BH)m [kJ/m³] |
|---|---|---|---|---|---|---|---|---|
| Example 17 | $Sm_{26.0}Fe_{22.0}Cu_{5.00}Zr_{1.70}Co_{bal}$ | 1190 | 210 | 1120 | 31 | 0.05 | 8.28 | 260 |
| Example 18 | $Sm_{26.0}Fe_{22.0}Cu_{5.00}Zr_{1.70}Co_{bal}$ | 1190 | 210 | 1145 | 31 | 0.05 | 8.31 | 265 |
| Example 19 | $Sm_{26.0}Fe_{22.0}Cu_{5.00}Zr_{1.70}Co_{bal}$ | 1190 | 210 | 1170 | 31 | 0.05 | 8.33 | 270 |
| Example 20 | $Sm_{21.0}Pr_{5.0}Fe_{22.0}Cu_{5.00}Zr_{1.70}Co_{bal}$ | 1190 | 210 | 1170 | 31 | 0.05 | 8.27 | 270 |
| Comparative Example 3 | $Sm_{26.0}Fe_{22.0}Cu_{5.00}Zr_{1.70}Co_{bal}$ | 1190 | 210 | 1170 | 31 | 0.05 | 8.24 | 255 |

| | Hcj [kA/m] | Hk/Hcj [%] | α [%/° C.] | β [%/° C.] | Cell size [nm] | Maximum angle of deviation from c-axis [°] |
|---|---|---|---|---|---|---|
| Example 17 | 66 | 2050 | 0.035 | 0.24 | 150 | 48 |
| Example 18 | 69 | 1875 | 0.027 | 0.25 | 250 | 43 |
| Example 19 | 71 | 1645 | 0.033 | 0.28 | 350 | 39 |
| Example 20 | 72 | 1605 | 0.039 | 0.29 | 400 | 51 |
| Comparative Example 3 | 64 | 1400 | 0.036 | 0.34 | 95 | 73 |

TABLE 5

| | Composition (mass %) | Sintering temperature [° C.] | Sintering time [min] | Solution-treatment temperature [° C.] | Solution-treatment time [h] | Temperature decreasing rate [° C.]/min] | Density [g/cm³] | (BH)m [kJ/m³] |
|---|---|---|---|---|---|---|---|---|
| Example 21 | $Sm_{23.0}Fe_{23.5}Cu_{4.85}Zr_{2.50}Co_{bal}$ | 1215 | 60 | 1160 | 65 | 0.01 | 8.31 | 270 |
| Example 22 | $Sm_{23.0}Fe_{23.5}Cu_{4.85}Zr_{2.50}Co_{bal}$ | 1215 | 60 | 1160 | 120 | 0.01 | 8.33 | 265 |
| Example 23 | $Sm_{22.0}Ce_{1.0}Fe_{23.5}Cu_{4.85}Zr_{2.50}Co_{bal}$ | 1215 | 60 | 1160 | 120 | 0.01 | 8.33 | 270 |
| Comparative Example 4 | $Sm_{23.0}Fe_{23.5}Cu_{4.85}Zr_{2.50}Co_{bal}$ | 1215 | 100 | 1160 | 120 | 4 | 8.25 | 240 |
| Comparative Example 5 | $Sm_{23.0}Fe_{23.5}Cu_{4.85}Zr_{2.50}Co_{bal}$ | 1215 | 60 | 1160 | 5 | 0.01 | 8.24 | 245 |

| | Hcj [kA/m] | Hk/Hcj [%] | α [%/° C.] | β [%/° C.] | Cell size [nm] | Maximum angle of deviation from c-axis [°] |
|---|---|---|---|---|---|---|
| Example 21 | 1800 | 75 | 0.036 | 0.33 | 250 | 36 |
| Example 22 | 2000 | 73 | 0.037 | 0.34 | 350 | 30 |
| Example 23 | 1610 | 70 | 0.035 | 0.3 | 400 | 58 |
| Comparative Example 4 | 1505 | 61 | 0.041 | 0.35 | 90 | 85 |
| Comparative Example 5 | 1300 | 57 | 0.042 | 0.36 | 95 | 80 |

TABLE 6

| | Composition (mass %) | Sintering temperature [° C.] | Sintering time [min] | Solution-treatment temperature [° C.] | Solution-treatment time [h] | Temperature decreasing rate [° C.]/min] | Density [g/cm³] | (BH)m [kJ/m³] |
|---|---|---|---|---|---|---|---|---|
| Example 24 | $Sm_{23.5}Fe_{24.5}Cu_{4.50}Zr_{2.15}Co_{bal}$ | 1200 | 120 | 1170 | 40 | 0.01 | 8.33 | 261 |
| Example 25 | $Sm_{23.5}Fe_{24.5}Cu_{4.50}Zr_{2.15}Co_{bal}$ | 1200 | 120 | 1170 | 40 | 0.1 | 8.31 | 272 |
| Example 26 | $Sm_{23.5}Fe_{24.5}Cu_{4.50}Zr_{2.15}Co_{bal}$ | 1200 | 120 | 1170 | 40 | 1 | 8.28 | 271 |
| Example 27 | $Sm_{23.5}Fe_{24.5}Cu_{4.50}Zr_{2.15}Co_{bal}$ | 1200 | 120 | 1170 | 40 | 3 | 8.26 | 268 |
| Example 28 | $Sm_{23.5}Fe_{24.5}Cu_{4.50}Zr_{2.15}Co_{bal}$ | 1200 | 120 | 1170 | 50 | 0.01 | 8.34 | 264 |
| Example 29 | $Sm_{23.5}Fe_{24.5}Cu_{4.50}Zr_{2.15}Co_{bal}$ | 1200 | 120 | 1170 | 50 | 3 | 8.32 | 269 |
| Example 30 | $Sm_{23.5}Fe_{24.5}Cu_{4.50}Zr_{2.15}Co_{bal}$ | 1200 | 120 | 1170 | 100 | 0.1 | 8.28 | 275 |
| Example 31 | $Sm_{23.5}Fe_{24.5}Cu_{4.50}Zr_{2.15}Co_{bal}$ | 1200 | 120 | 1170 | 100 | 1 | 8.3 | 273 |
| Example 32 | $Sm_{23.5}Fe_{24.5}Cu_{4.50}Zr_{2.15}Co_{bal}$ | 1200 | 120 | 1170 | 120 | 0.01 | 8.31 | 278 |
| Example 33 | $Sm_{23.5}Fe_{24.5}Cu_{4.50}Zr_{2.15}Co_{bal}$ | 1200 | 120 | 1170 | 120 | 3 | 8.29 | 270 |
| Comparative Example 6 | $Sm_{23.5}Fe_{24.5}Cu_{4.50}Zr_{2.15}Co_{bal}$ | 1200 | 120 | 1170 | 4 | 0.01 | 8.27 | 240 |
| Comparative Example 7 | $Sm_{23.5}Fe_{24.5}Cu_{4.50}Zr_{2.15}Co_{bal}$ | 1200 | 120 | 1170 | 4 | 1 | 8.28 | 248 |
| Comparative Example 8 | $Sm_{23.5}Fe_{24.5}Cu_{4.50}Zr_{2.15}Co_{bal}$ | 1200 | 120 | 1170 | 10 | 0.1 | 8.24 | 251 |
| Comparative Example 9 | $Sm_{23.5}Fe_{24.5}Cu_{4.50}Zr_{2.15}Co_{bal}$ | 1200 | 120 | 1170 | 10 | 3 | 8.25 | 253 |
| Comparative Example 10 | $Sm_{23.5}Fe_{24.5}Cu_{4.50}Zr_{2.15}Co_{bal}$ | 1200 | 120 | 1170 | 20 | 0.1 | 8.26 | 257 |
| Comparative Example 11 | $Sm_{23.5}Fe_{24.5}Cu_{4.50}Zr_{2.15}Co_{bal}$ | 1200 | 120 | 1170 | 20 | 1 | 8.25 | 254 |
| Comparative Example 12 | $Sm_{23.5}Fe_{24.5}Cu_{4.50}Zr_{2.15}Co_{bal}$ | 1200 | 120 | 1170 | 130 | 0.01 | 8.27 | 258 |
| Comparative Example 13 | $Sm_{23.5}Fe_{24.5}Cu_{4.50}Zr_{2.15}Co_{bal}$ | 1200 | 120 | 1170 | 130 | 3 | 8.24 | 259 |
| Comparative Example 14 | $Sm_{23.5}Fe_{24.5}Cu_{4.50}Zr_{2.15}Co_{bal}$ | 1200 | 120 | 1170 | 100 | 4 | 8.24 | 255 |

| | Hcj [kA/m] | Hk/Hcj [%] | α [%/° C.] | β [%/° C.] | Cell size [nm] | Maximum angle of deviation from c-axis [°] |
|---|---|---|---|---|---|---|
| Example 24 | 1715 | 69 | 0.039 | 0.31 | 450 | 40 |
| Example 25 | 1815 | 74 | 0.037 | 0.33 | 400 | 45 |
| Example 26 | 1755 | 72 | 0.036 | 0.34 | 350 | 46 |
| Example 27 | 1610 | 67 | 0.037 | 0.32 | 250 | 55 |
| Example 28 | 1740 | 66 | 0.038 | 0.34 | 300 | 56 |
| Example 29 | 1780 | 65 | 0.037 | 0.33 | 475 | 52 |
| Example 30 | 1800 | 73 | 0.038 | 0.32 | 525 | 48 |
| Example 31 | 1765 | 70 | 0.039 | 0.31 | 550 | 41 |

TABLE 6-continued

| | | | | | | |
|---|---|---|---|---|---|---|
| Example 32 | 1925 | 75 | 0.037 | 0.3 | 600 | 35 |
| Example 33 | 1830 | 68 | 0.036 | 0.33 | 580 | 37 |
| Comparative Example 6 | 1700 | 55 | 0.035 | 0.34 | 70 | 68 |
| Comparative Example 7 | 1760 | 60 | 0.035 | 0.35 | 75 | 70 |
| Comparative Example 8 | 1620 | 61 | 0.04 | 0.36 | 80 | 73 |
| Comparative Example 9 | 1555 | 60 | 0.04 | 0.33 | 85 | 75 |
| Comparative Example 10 | 1640 | 62 | 0.038 | 0.35 | 90 | 65 |
| Comparative Example 11 | 1580 | 61 | 0.04 | 0.35 | 90 | 65 |
| Comparative Example 12 | 1595 | 64 | 0.041 | 0.37 | 95 | 70 |
| Comparative Example 13 | 1570 | 63 | 0.04 | 0.36 | 95 | 70 |
| Comparative Example 14 | 1555 | 60 | 0.039 | 0.35 | 95 | 65 |

Summary of Results

In the examples shown in the Table 1, the manufacturing conditions were the same as each other, except that the content of Fe and the composition of rare-earth elements were changed. As shown in the Table 1, regarding the permanent magnets according to the Example 1 to 5 in each of which the content of Fe was 22 to 27 mass %, all of which were manufactured by the manufacturing method according to the present disclosure, the cell size was 100 to 600 nm; the degree of orientation of crystal grains was equal to or smaller than 600 with respect to the axis of the easy magnetization; the temperature coefficient α of the residual magnetic flux density in the temperature range of 20 to 200° C. is smaller than 0.045%/° C. (α<0.045%/° C.); and the temperature coefficient β of the intrinsic coercive force was smaller than 0.35%/° C. (β<0.35%/° C.). It has been found that in all the permanent magnets according to the Example 1 to 5, the density is equal to or higher than 8.25 g/cm$^3$: the maximum energy product (BH)m is equal to or larger than 260 kJ/m$^3$; the coercive force Hcj is equal to or larger than 1,600 kA/m; and the squareness ratio Hk/Hcj is equal to or higher than 65%. That is, it has been found that these permanent magnets have excellent magnetic characteristics.

On the other hand, in each of the Comparative Example 1 in which the content of Fe was 20 mass % and the Comparative Example 2 in which the content of Fe was 29 mass %, the cell size was smaller than 100 nm even though they were manufactured under the same manufacturing conditions. That is, no permanent magnet having excellent magnetic characteristics was obtained in either of them.

The Examples 6 to 11 shown in the Table 2 are examples in which the sintering temperature was changed. In all the permanent magnets obtained in the Example 6 to 11, the cell size was 100 to 600 nm and they had excellent magnetic characteristics. Among them, in the Examples 6 to 10 in which the sintering temperature was within the range of 1,180 to 1,220° C., the degree of orientation was equal to or smaller than 60° C.; the temperature coefficient α of the residual magnetic flux density in the temperature range of 20 to 200° C. was smaller than 0.045%/° C. (α<0.045%/° C.); and the temperature coefficient 3 of the intrinsic coercive force was smaller than 0.35%/° C. (β<0.35%/° C.). Further, they had excellent magnetic characteristics. The Examples 12 to 16 shown in the Table 3 are examples in which the sintering temperature was changed. In all the permanent magnets obtained in the Example 12 to 16, the cell size was 100 to 600 nm and they had excellent magnetic characteristics. Among them, in the Examples 12 to 15 in which the sintering time was within the range of 20 to 240 min, the degree of orientation was equal to or smaller than 60° C.; the temperature coefficient α of the residual magnetic flux density in the temperature range of 20 to 200° C. was smaller than 0.045%/° C. (α<0.045%/° C.); and the temperature coefficient β of the intrinsic coercive force was smaller than 0.35%/° C. (β<0.35%/° C.). Further, they had excellent magnetic characteristics.

The examples in the Table 4 are examples in which the solution-treatment temperature was mainly changed. In the permanent magnet according to the Comparative Example 3 in which the solution-treatment temperature was lowered to 1,110° C., no cell structure having a cell size of 100 nm or larger was formed and the degree of orientation exceeded 60°. Further, the permanent magnet according to the Comparative Example 3 has poor magnetic characteristics.

The examples in the Table 5 are examples in which the solution-treatment time and the temperature decreasing rate were mainly changed. In the Comparative Example 4 in which the temperature decreasing rate was increased and the Comparative Example 5 in which the solution-treatment time was shortened, no cell structure having a cell size of 100 nm or larger was formed and the degree of orientation exceeded 60°. Further, the permanent magnets according to the Comparative Examples 4 and 5 have poor magnetic characteristics.

The Table 6 shows examples which were also manufactured under the same conditions, except for the solution-treatment time and the temperature decreasing rate. As shown in the Table 6, it has been found that by the manufacturing method according to the present disclosure in which the temperature decreasing rate after the sintering was adjusted to 0.01 to 0.3° C./min and the solution treatment was performed at a predetermined solution-treatment temperature for 31 to 120 hours, it is possible to obtain a permanent magnet in which the cell size is 100 to 600 nm; the degree of orientation is 600 or smaller; the temperature coefficient α of the residual magnetic flux density in the temperature range of 20 to 200° C. was smaller than 0.045%/° C. (α<0.045%/° C.); and the temperature coefficient β of the intrinsic coercive force was smaller than 0.35%/° C. (β<0.35%/° C.). It has been found that in all the permanent magnets according to the Example 24 to 33 manufactured as described above, the density is equal to or higher than 8.25 $g/cm^3$: the maximum energy product (BH)m is equal to or larger than 260 $kJ/m^3$; the coercive force Hcj is equal to or larger than 1,600 kA/m; and the squareness ratio Hk/Hcj is equal to or larger than 65%. That is, it has been found that these permanent magnets have excellent magnetic characteristics.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion equal to or smaller than the scope of the following claims.

The invention claimed is:

1. A rare-earth cobalt permanent magnet consisting of 23 to 27 mass % of a rare-earth element R, 4.0 to 5.0 mass % of Cu, 22 to 24.5 mass % of Fe, 1.7 to 2.5 mass % of Zr, and a remainder consisting of Co and unavoidable impurities, wherein the rare-earth element R consists of Sm, and wherein the rare-earth cobalt permanent magnet includes a plurality of crystal grains and grain boundary parts, a size of a cell structure constituting the crystal grain is 250 to 600 nm, an intrinsic coercive force Hcj is equal to or larger than 1,600 kA/m, when the intrinsic coercive force Hcj and a magnitude of a reverse magnetic field when a residual magnetic flux density Br is 90% is represented by Hk, a ratio Hk/Hcj is equal to or higher than 65%, and a maximum energy product (BH)m thereof is equal to or larger than 275 $kJ/m^3$ at 20° C.

2. The rare-earth cobalt permanent magnet according to claim 1, wherein a degree of orientation of the plurality of crystal grains is equal to or smaller than 60° with respect to an easy axis of magnetization.

3. The rare-earth cobalt permanent magnet according to claim 1, wherein relations $\alpha<0.045\%/°$ C. and $\beta<0.35\%/°$ C. hold at a temperature range of 20 to 200° C., where $\alpha$ and $\beta$ are temperature coefficients of a residual magnetic flux density Br and the intrinsic coercive force Hcj, respectively.

4. The rare-earth cobalt permanent magnet according to claim 1, wherein a density of the rare-earth cobalt permanent magnet is equal to or higher than 8.25 $g/cm^3$.

5. A device comprising the rare-earth cobalt permanent magnet according to claim 1.

6. A method for manufacturing the rare-earth cobalt permanent magnet according to claim 1, comprising:

a step (I) of preparing an alloy consisting of 23 to 27 mass % of Sm, 4.0 to 5.0 mass % of Cu, 22 to 24.5 mass % of Fe, 1.7 to 2.5 mass % of Zr, and a remainder consisting of Co and unavoidable impurities;

a pulverizing step (II) of pulverizing the alloy into a powder;

a pressure-molding step (III) of pressure-molding the powder into a molded body;

a sintering step (IV) of heating the molded body and thereby forming a sintered body;

a step (V) of gradually cooling the sintered body at a temperature decreasing rate of 0.01 to 3° C./min; and a solution treatment step (VI) of heating the gradually-cooled sintered body at 1,120 to 1,170° C. for 31 to 120 hours.

7. The method for manufacturing a rare-earth cobalt permanent magnet according to claim 6, wherein the sintering step (IV) is carried out at 1,180 to 1,220° C. for 20 to 240 minutes.

* * * * *